US011878195B2

(12) United States Patent
Fazzio

(10) Patent No.: US 11,878,195 B2
(45) Date of Patent: Jan. 23, 2024

(54) AUTO-REGULATING APERTURE FOR FIRE EXTINGUISHER DISCHARGE

(71) Applicant: Kidde Technologies, Inc., Wilson, NC (US)

(72) Inventor: Mark P. Fazzio, Wilson, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 0 days.

(21) Appl. No.: 17/572,372

(22) Filed: Jan. 10, 2022

(65) Prior Publication Data

US 2022/0126149 A1 Apr. 28, 2022

Related U.S. Application Data

(62) Division of application No. 16/360,784, filed on Mar. 21, 2019, now Pat. No. 11,229,813.

(51) Int. Cl.

*A62C 37/09* (2006.01)
*A62C 3/08* (2006.01)
*B05B 1/32* (2006.01)
*B05B 12/08* (2006.01)

(52) U.S. Cl.

CPC ................ *A62C 37/09* (2013.01); *A62C 3/08* (2013.01); *B05B 1/32* (2013.01); *B05B 12/08* (2013.01)

(58) Field of Classification Search

CPC .. A62C 37/09; A62C 3/08; B05B 1/32; B05B 12/08
See application file for complete search history.

(56) References Cited

U.S. PATENT DOCUMENTS 3,776,470 A 12/1973 Tsuchiya
8,002,203 B2 8/2011 Crabtree et al.
8,383,911 B1 1/2013 Goldin et al.
8,651,142 B2 2/2014 Sellers et al.
8,833,071 B2 9/2014 Langbein et al.
2005/0258275 A1 11/2005 Williams
2018/0111135 A1 4/2018 Zito, Jr. et al.
2018/0207461 A1 7/2018 Lucas et al.

FOREIGN PATENT DOCUMENTS

DE 4236545 C1 1/1994

OTHER PUBLICATIONS

European Search Report Application No. EP19208903; dated Jun. 8, 2020; pp. 9.

*Primary Examiner* — Steven M Cernoch
(74) *Attorney, Agent, or Firm* — CANTOR COLBURN LLP

(57) ABSTRACT

A fire extinguisher discharge nozzle is provided and includes sidewalls and a biasing element. The sidewalls define an aperture through which a medium(s) is dischargeable and are adjustable between multiple first and multiple second positions associated with dilated and constricted conditions of the aperture, respectively. The biasing element is configured to bias the sidewalls toward assuming one of the multiple first or multiple second positions. The sidewalls are drivable toward assuming the other one of the multiple first or multiple second positions in opposition to bias applied by the biasing element in accordance with a characteristic of the medium(s).

7 Claims, 4 Drawing Sheets

AUTO-REGULATING APERTURE FOR FIRE EXTINGUISHER DISCHARGE

CROSS-REFERENCE TO RELATED APPLICATIONS

This application is a division of U.S. application Ser. No. 16/360,784 filed Mar. 21, 2019, the disclosure of which is incorporated herein by reference in its entirety.

BACKGROUND

The following description relates to fire extinguishers and, more particularly, to an auto-regulating aperture for controlling discharge of a fire extinguisher.

Aircraft propulsion bay fire protection systems typically include fire extinguishing components whereby a fire suppression or extinguishing medium(s) is discharged through a distribution system of tubing, fittings, restrictions and nozzles. The components of these systems are usually fixed but still need to provide for rapid discharge to achieve a required concentration of fire suppression or extinguishing medium(s) for a required duration of time. For example, nozzles in aircraft propulsion bay fire protection systems are designed with fixed openings that cannot be adjusted in real-time. Therefore, as fire suppression or extinguishing medium(s) is discharged, the flow rate, pressure and velocity of the fire suppression or extinguishing medium(s) decreases over time as the quantity of the remaining fire suppression or extinguishing medium(s) available to be discharged also decrease.

BRIEF DESCRIPTION

According to an aspect of the disclosure, a fire extinguisher discharge nozzle is provided and includes sidewalls and a biasing element. The sidewalls define an aperture through which a medium(s) is dischargeable and are adjustable between multiple first and multiple second positions associated with dilated and constricted conditions of the aperture, respectively. The biasing element is configured to bias the sidewalls toward assuming one of the multiple first or multiple second positions. The sidewalls are drivable toward assuming the other one of the multiple first or multiple second positions in opposition to bias applied by the biasing element in accordance with a characteristic of the medium(s).

In accordance with additional or alternative embodiments, the medium(s) includes fire suppressing or extinguishing medium(s).

In accordance with additional or alternative embodiments, the biasing element includes an elastic band that biases the sidewalls toward assuming the one of the multiple first or multiple second positions.

In accordance with additional or alternative embodiments, the biasing element includes a fixed structure and an elastic element, which is anchored to the fixed structure and the sidewalls, and which biases the sidewalls toward assuming the one of the multiple first or multiple second positions.

In accordance with additional or alternative embodiments, the biasing element includes at least one of smart materials and shape memory alloys disposed in or external relative to the sidewalls to bias the sidewalls toward assuming the one of the multiple first or multiple second positions.

In accordance with additional or alternative embodiments, the characteristic of the medium(s) includes at least one of a velocity, a pressure and a flow rate of the medium(s).

In accordance with additional or alternative embodiments, an actuating element is configured to drive the sidewalls toward assuming the other one of the multiple first or multiple second positions in opposition to the bias applied by the biasing element. The actuating element includes a driving mechanism and a controller. The controller includes a sensor configured to sense the characteristic of the medium(s), a processor configured to determine whether to control the driving mechanism based on readings of the sensor and circuitry by which the processor is coupled to the driving mechanism.

In accordance with additional or alternative embodiments, an actuating element is configured to drive the sidewalls toward assuming the other one of the multiple first or multiple second positions in opposition to the bias applied by the biasing element. The actuating element includes at least one of smart materials and shape memory alloys disposed in or external to the sidewalls and a controller. The controller includes a sensor configured to sense the characteristic of the medium(s), a processor configured to determine whether to control the driving mechanism based on readings of the sensor and circuitry by which the processor is coupled to the at least one of smart materials and shape memory alloys.

According to another aspect of the disclosure, a fire protection system for suppressing fire in a propulsion bay is provided. The fire protection system includes a tank, a fire extinguisher discharge nozzle disposed in the propulsion bay and a distribution system. The distribution system fluidly couples the tank and the fire extinguisher discharge nozzle such that the fire extinguisher discharge nozzle is receptive of a medium(s) from the tank. The fire extinguisher discharge nozzle includes sidewalls, a biasing element and an actuating element. The sidewalls define an aperture through which the medium(s) is dischargeable and are adjustable between multiple first and multiple second positions associated with dilated and constricted conditions of the aperture, respectively. The biasing element is configured to bias the sidewalls toward assuming one of the multiple first or multiple second positions. The actuating element is configured to drive the sidewalls toward assuming the other one of the multiple first or multiple second positions in opposition to bias applied by the biasing element in accordance with a characteristic of the medium(s).

In accordance with additional or alternative embodiments, the medium(s) includes fire suppressing or extinguishing medium(s).

In accordance with additional or alternative embodiments, the tank is disposed remotely from the propulsion bay.

In accordance with additional or alternative embodiments, the biasing element includes an elastic band that biases the sidewalls toward assuming the one of the multiple first or multiple second positions.

In accordance with additional or alternative embodiments, the biasing element includes a fixed structure of the propulsion bay and an elastic element, which is anchored to the fixed structure of the propulsion bay and the sidewalls, and which biases the sidewalls toward assuming the one of the multiple first or multiple second positions.

In accordance with additional or alternative embodiments, the biasing element includes at least one of smart materials and shape memory alloys disposed in or external to the sidewalls to bias the sidewalls toward assuming the one of the multiple first or multiple second positions.

In accordance with additional or alternative embodiments, the characteristic of the medium(s) includes at least one of a velocity, a pressure and a flow rate of the medium(s).

In accordance with additional or alternative embodiments, the actuating element includes a driving mechanism and a controller. The controller includes a sensor configured to sense the characteristic of the medium(s), a processor configured to determine whether to control the driving mechanism based on readings of the sensor and circuitry by which the processor is coupled to the driving mechanism.

In accordance with additional or alternative embodiments, the actuating element includes at least one of smart materials and shape memory alloys disposed in or external to the sidewalls and a controller. The controller includes a sensor configured to sense the characteristic of the medium(s), a processor configured to determine whether to control the driving mechanism based on readings of the sensor and circuitry by which the processor is coupled to the at least one of smart materials and shape memory alloys.

According to another aspect of the disclosure, an aircraft is provided and includes an airframe formed to define the propulsion bay and to support and accommodate the tank, the fire extinguisher discharge nozzle and the distribution system.

According to another aspect of the disclosure, a method of operating a fire extinguisher discharge nozzle is provided. The fire extinguisher discharge nozzle includes sidewalls defining an aperture through which a medium(s) is dischargeable. The sidewalls are adjustable between multiple first and multiple second positions associated with dilated and constricted conditions of the aperture, respectively. The method includes biasing the sidewalls toward assuming one of the multiple first or multiple second positions and driving the sidewalls toward assuming the other one of the multiple first or multiple second positions in opposition to the biasing in accordance with a characteristic of the medium(s). The driving includes sensing the characteristic of the medium(s) and determining whether to control the driving based on results of the sensing.

In accordance with additional or alternative embodiments, the characteristic of the medium(s) comprises at least one of a velocity, a pressure and a flow rate of the medium(s).

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

Figure 1:
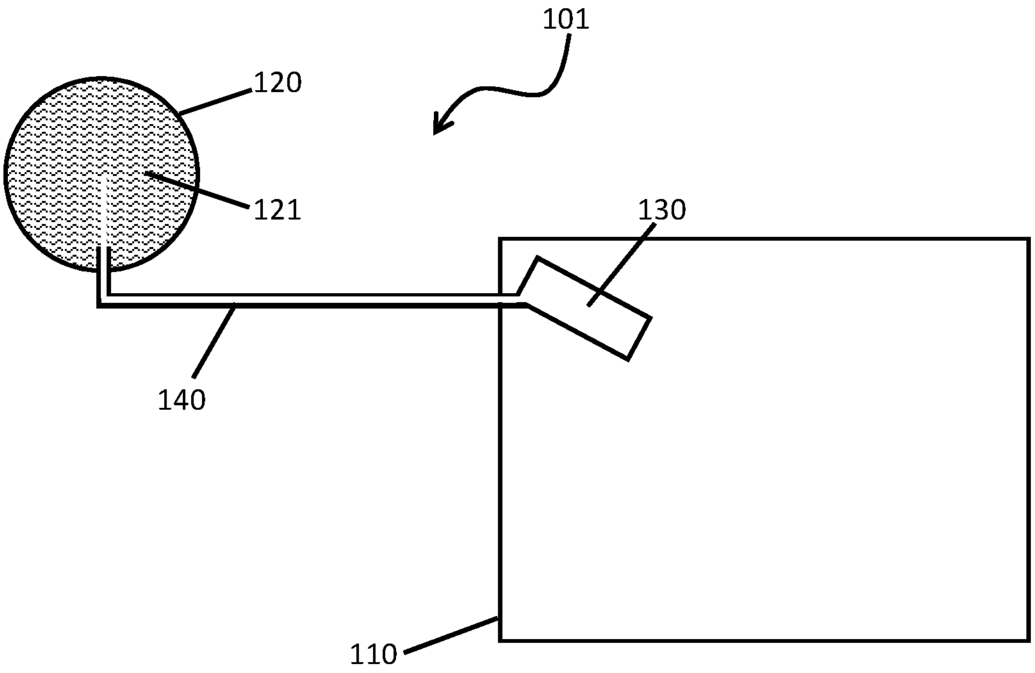
FIG. 1 is a schematic view of a distribution system of an aircraft fire protection system in accordance with embodiments.

These and other advantages and features will become more apparent from the following description taken in conjunction with the drawings.

DETAILED DESCRIPTION

As will be described below, a nozzle for use within a distribution system is provided. The nozzle opens during an initial higher pressure portion of the discharge operation and then partially closes to restrict the flow and extend the discharge time. The nozzle or component can include parallel plates or opposing tube halves which are positioned to set a small gap. The plates or tube halves are connected to a spring or other mechanism that act to allow an opening of the gap when pressure is applied. As the internal pressure decreases, the gap narrows. The closing mechanism can be a band around the component, an internal or external spring or dampening mechanism, or can be based on the elastic mechanical properties of the nozzle/component itself With reference to FIG. 1, a fire protection system 101 is provided for suppressing or extinguishing fire in a propulsion bay 110. The fire protection system 101 includes a tank 120 that is configured to contain a supply of fire suppressing or extinguishing medium(s) 121, a fire extinguisher discharge nozzle 130 that is disposed in the propulsion bay 110 and a distribution system 140. The tank 120 may be disposed remotely from the propulsion bay 110. The distribution system 140 fluidly couples the tank 120 and the fire extinguisher discharge nozzle 130 such that the fire extinguisher discharge nozzle 130 is receptive of medium(s) (i.e., the fire suppressing or extinguishing medium(s) 121) from the tank 120.

The following description will refer to the medium(s) 121 as the fire suppressing or extinguishing medium(s) 121. This is done for clarity and brevity and is to be understood that this naming convention does not limit the scope of this disclosure in any way.

Figure 2:
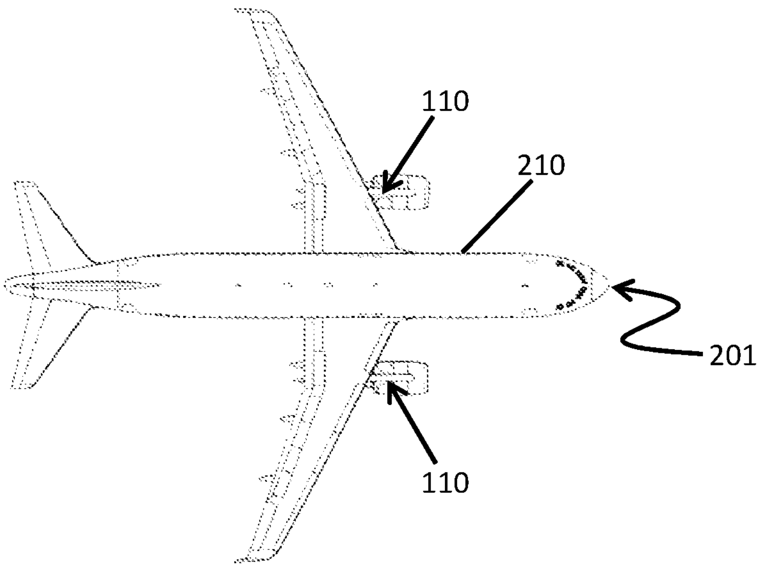
FIG. 2 is a top-down view of an aircraft with a propulsion bay in accordance with embodiments.

With continued reference to FIG. 1 and with additional reference to FIG. 2 and in accordance with embodiments, the fire protection system 101 may be provided for suppressing fire in the propulsion bay 110 of an aircraft 201 for example. This aircraft 201 includes an airframe 210 which is configured to define the propulsion bay 110 and to support and accommodate the tank 120, the fire extinguisher discharge nozzle 130 and the distribution system 140.

Figure 3:
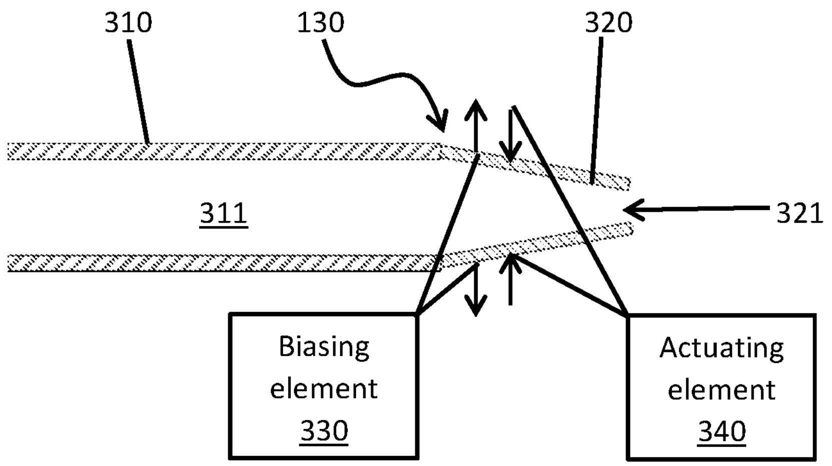
FIG. 3 is a schematic diagram of a fire extinguisher discharge nozzle in accordance with embodiments.

With continued reference to FIG. 1 and with additional reference to FIG. 3, the fire extinguisher discharge nozzle 130 includes a tubular member 310, sidewalls 320, a biasing element 330 and an actuating element 340 (it is to be understood that the biasing element 330 and the actuating element 340 can act inversely to the directions shown in FIG. 3). The tubular member 310 is formed to define a pathway 311 along which the medium(s) 121, which is received from the tank 120 via the distribution system 140, can flow. The sidewalls 320 can be provided as a single, unitary (i.e., conical or frusto-conical) wall element or as multiple (i.e., two or more) wall elements. In any case, the sidewalls 320 are formed to define an aperture 321 through which the medium(s) 121 having flown along the pathway 311 is dischargeable from the fire extinguisher discharge nozzle 130. The sidewalls 320 are attached to an outlet of the tubular member 310 and are adjustable, movable, rotatable, flexible or pivotable between multiple first positions and multiple second positions. The multiple first positions are associated with dilated conditions of the aperture 321. The multiple second positions are associated with constricted conditions of the aperture 321. The biasing element 330 is configured to bias the sidewalls 320 toward assuming one of the multiple first positons or the multiple second positions. The actuating element 340 is configured to drive the sidewalls 320 toward assuming the other one of the multiple first positions or the multiple second positions in opposition to bias applied by the biasing element 330 in accordance with a characteristic of the medium(s) 121.

The following description will refer to the embodiments in which the biasing element 330 biases the sidewalls 320 toward assuming the multiple first positons and the actuating element 340 is configured to drive the sidewalls 320 toward assuming the multiple second positions. This is done for clarity and brevity and is to be understood that this convention does not limit the scope of this disclosure in any way.

In accordance with embodiments, the characteristic of the medium(s) 121 is at least one of a velocity, a pressure and a flow rate of the medium(s) 121. Thus, where the biasing element 330 is configured to bias the sidewalls 320 toward assuming the multiple first positions, the actuating element 340 is configured to drive the sidewalls 320 toward increasingly assuming the multiple second positions over time in opposition to bias applied by the biasing element 330 in accordance with the at least one of the velocity, the pressure and the flow rate of the medium(s) 121. That is, in an exemplary case, when the medium(s) 121 is initially discharged from the fire extinguisher discharge nozzle 130, the at least one of the velocity, the pressure and the flow rate of the medium(s) 121 will indicate that a relatively large quantity of the medium(s) 121 is and remains available. In this instance, the actuating element 340 will not drive the sidewalls 320 toward assuming the multiple second positions and the bias applied by the biasing element 330 will bias the sidewalls 320 toward assuming the multiple first positions because a velocity, pressure and/or a flow rate of the discharged medium(s) 121 will be sufficient even with the aperture 321 being dilated. However, as the medium(s) 121 is continually discharged, the at least one of the velocity, the pressure and the flow rate of the medium(s) 121 will indicate that the medium(s) 121 is depleted and becomes relatively small. In this instance, the actuating element 340 will drive the sidewalls 320 toward assuming the multiple second positions in opposition to the bias applied by the biasing element 330 so as to constrict the aperture 321 and thereby control the velocity, pressure and/or the flow rate of the discharged medium(s) 121 at sufficient levels for as long as possible.

Figure 4:
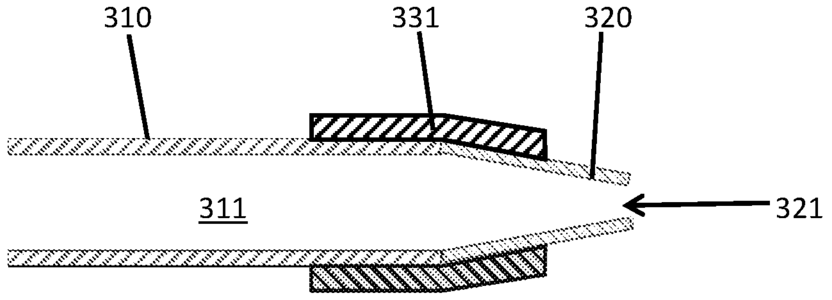
FIG. 4 is a schematic diagram of the fire extinguisher discharge nozzle in accordance with further embodiments.
Figure 5:
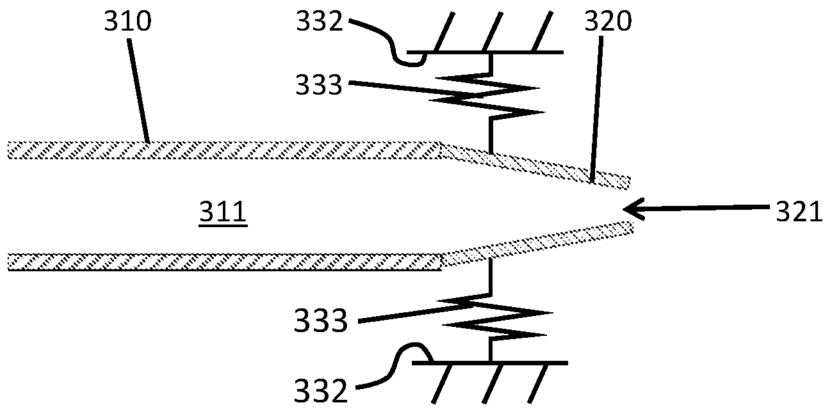
FIG. 5 is a schematic diagram of the fire extinguisher discharge nozzle in accordance with further embodiments.
Figure 6:
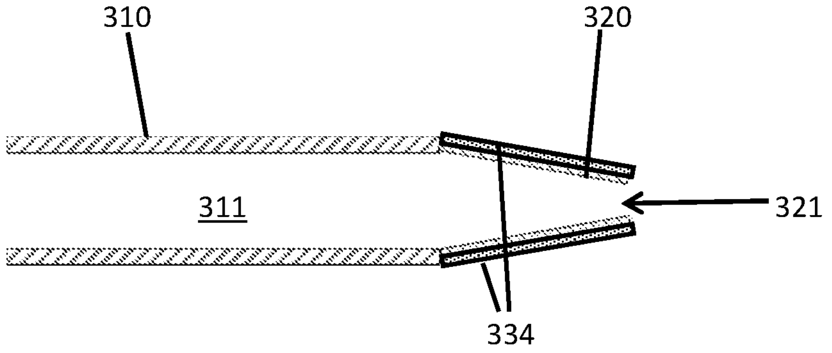
FIG. 6 is a schematic diagram of the fire extinguisher discharge nozzle in accordance with further embodiments.

With continued reference to FIG. 3 and with additional reference to FIGS. 4-6 and in accordance with further embodiments, the biasing element 330 can include or be provided as one or more of multiple features. For example, as shown in FIG. 4, the biasing element 330 can include an elastic band 331 that is affixed to an exterior surface of the sidewalls 320 and thus configured to bias the sidewalls 320 toward assuming the multiple first positions. As another example, as shown in FIG. 5, the biasing element 330 can include a fixed structure 332 of the propulsion bay 110 (see FIG. 1) or the tubular member 310 and an elastic element 333, such as a compression spring, which is anchored to the fixed structure 332 and the sidewalls 320, and which biases the sidewalls 320 toward assuming the multiple first positions. As yet another example, as shown in FIG. 6, the biasing element 330 can include at least one of smart materials and shape memory alloys 334 disposed in or external to the sidewalls 320 such that the natural or base shape of the at least one of smart materials and shape memory alloys 334 thereby bias the sidewalls 320 toward assuming the multiple first positions.

Figure 7:
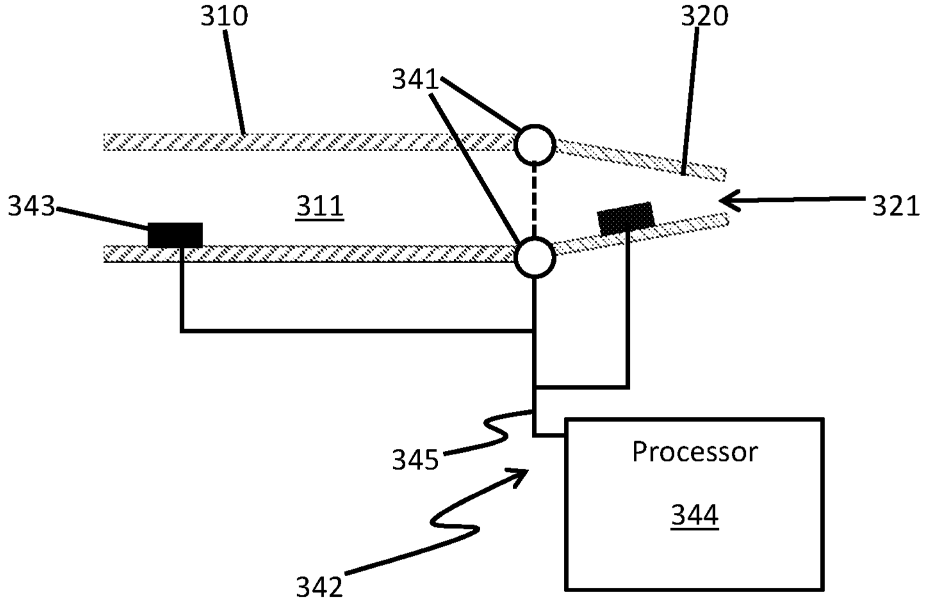
FIG. 7 is a schematic diagram of the fire extinguisher discharge nozzle in accordance with further embodiments.
Figure 8:
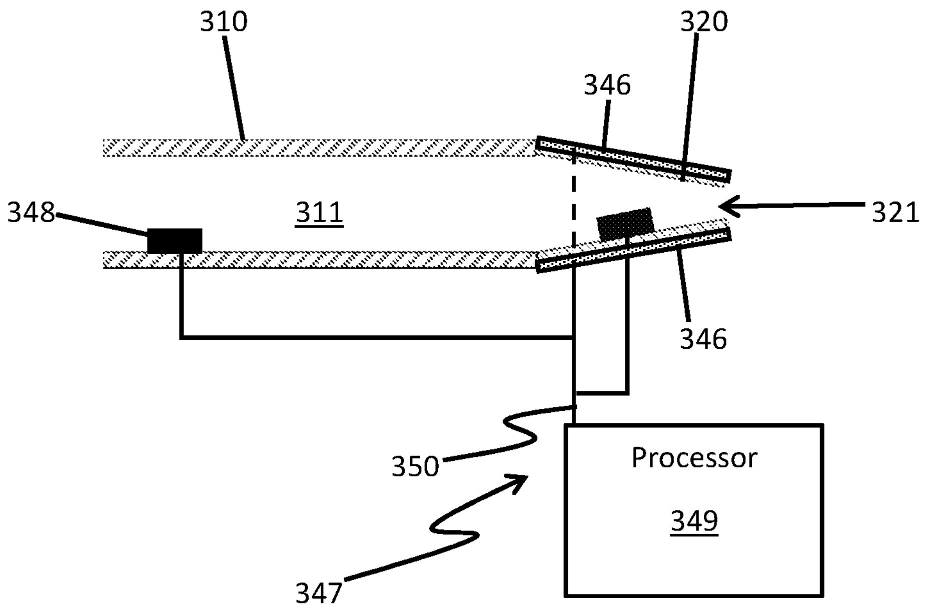
FIG. 8 is a schematic diagram of the fire extinguisher discharge nozzle in accordance with further embodiments.

With continued reference to FIG. 3 and with additional reference to FIGS. 7 and 8 and in accordance with further embodiments, the actuating element 340 can include or be provided as one or more of multiple features. For example, as shown in FIG. 7, the actuating element 340 can include a driving mechanism 341 configured to drive the sidewalls 320 toward the multiple second positions and a controller 342. The driving mechanism 341 can include or be provided as a linear or rotary actuator, for example. The controller 342 includes a sensor array 343 configured to sense the characteristic of the medium(s) 121 as well as a dilated or constricted condition of the aperture 321, a processor 344 configured to determine whether to control the driving mechanism 341 based on readings of the sensor array 343 and circuitry 345 by which the processor 344 is coupled to the sensor array 343 and the driving mechanism 341. As another example, as shown in FIG. 8, the actuating element 340 can include at least one of smart materials and shape memory alloys 346 disposed in or external to the sidewalls 320 such that the at least one of smart materials and shape memory alloys 346 are configured to drive the sidewalls 320 toward the multiple second positions and a controller 347. The controller 347 includes a sensor array 348 configured to sense the characteristic of the medium(s) 121 as well as a dilated or constricted condition of the aperture 321, a processor 349 configured to determine whether to control the at least one of smart materials and shape memory alloys 346 based on readings of the sensor array 348 and circuitry 350 by which the processor 349 is coupled to the at least one of smart materials and shape memory alloys 346.

In accordance with still further additional embodiments, it is to be understood that any one or more of the embodiments of FIGS. 4-6 can be used in concert with either one or both of the embodiments of FIGS. 7 and 8 and vice versa.

Figure 9:
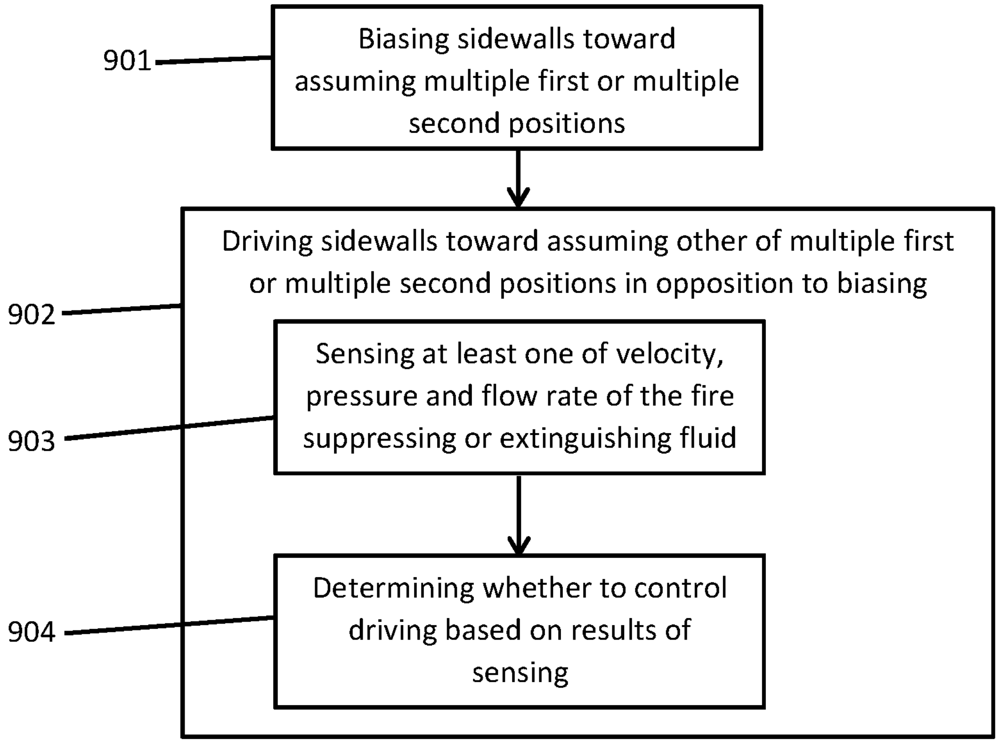
FIG. 9 is a flow diagram illustrating a method of operating a fire extinguisher discharge nozzle in accordance with embodiments.

With reference to FIG. 9, a method of operating the fire extinguisher discharge nozzle 130 described herein is provided. As shown in FIG. 9, the method includes biasing the sidewalls 320 toward assuming one of the multiple first or multiple second positions (901) and driving the sidewalls 320 toward assuming the other one of the multiple first or multiple second positions in opposition to the biasing of operation 901 (902). In accordance with embodiments, the driving of operation 902 includes sensing at least one of the velocity, the pressure and the flow rate of the medium(s) 121 (903) and determining whether to control the driving of operation 902 based on results of the sensing of operation 903 (904).

Technical effects and benefits of the features described herein are an optimization of weight of fire suppressing or extinguishing medium(s) by enabling an initial high quantity of medium(s) to fill a protected bay to a required concentration followed by a lower mass flow rate of medium(s) to maintain this concentration for a required duration. The size of the extinguisher can also be reduced.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A fire extinguisher discharge nozzle, comprising:

sidewalls defining an aperture through which a medium(s) is dischargeable, the sidewalls being adjustable between multiple first and multiple second positions associated with dilated and constricted conditions of the aperture, respectively; and a biasing element configured to bias the sidewalls toward assuming one of the multiple first or multiple second positions, the sidewalls being drivable toward assuming the other one of the multiple first or multiple second positions in opposition to bias applied by the biasing element in accordance with a characteristic of the medium(s), wherein:

the fire extinguisher discharge nozzle further comprises an actuating element configured to drive the sidewalls toward assuming the other one of the multiple first or multiple second positions in opposition to the bias applied by the biasing element, and the actuating element comprises:

at least one of smart materials and shape memory alloys disposed in or external to the sidewalls; and a controller comprising a sensor configured to sense the characteristic of the medium(s), a processor configured to control the at least one of the smart materials and the shape memory alloys based on readings of the sensor and circuitry by which the processor is coupled to the at least one of the smart materials and the shape memory alloys.

2. The fire extinguisher discharge nozzle according to claim 1, wherein the medium(s) comprises fire suppressing or extinguishing medium(s).

3. The fire extinguisher discharge nozzle according to claim 1, wherein the biasing element comprises an elastic band that biases the sidewalls toward assuming the one of the multiple first or multiple second positions.

4. The fire extinguisher discharge nozzle according to claim 1, wherein the biasing element comprises:

a fixed structure; and an elastic element, which is anchored to the fixed structure and the sidewalls, and which biases the sidewalls toward assuming the one of the multiple first or multiple second positions.

5. The fire extinguisher discharge nozzle according to claim 1, wherein the characteristic of the medium comprises at least one of a velocity, a pressure and a flow rate of the medium(s).

6. A fire extinguisher discharge nozzle, comprising:

a tubular member;

sidewalls extending at first ends thereof from the tubular member and defining at second ends thereof, which are opposite the first ends, an aperture through which a medium(s) is dischargeable;

a biasing element configured to bias the sidewalls to cause the second ends to assume one of dilated and constricted conditions; and an actuating element configured to drive the sidewalls to cause the second ends to assume the other one of the dilated and constricted conditions in opposition to the bias, the actuating element comprising at least one of smart materials and shape memory alloys disposed in abutment with external surfaces of the sidewalls and a controller to control the at least one of the smart materials and the shape memory alloys based on a characteristic of the medium(s), wherein the controller comprises:

a sensor configured to sense the characteristic of the medium(s);

a processor configured to determine whether to control the at least one of the smart materials and the shape memory alloys based on readings of the sensor; and circuitry by which the processor is coupled to the at least one of the smart materials and the shape memory alloys.

7. The fire extinguisher discharge nozzle according to claim 6, wherein the at least one of the smart materials and the shape memory alloys are disposed in abutment with entire lengths of the external surfaces of the sidewalls from the first ends thereof to the second ends thereof.

* * * * *